United States Patent Office 3,030,341
Patented Apr. 17, 1962

3,030,341
MANUFACTURE OF PREPOLYMERS
Paul E. Willard, Baltimore, Md., assignor to FMC Corporation, a corporation of Delaware
No Drawing. Filed May 6, 1959, Ser. No. 811,276
8 Claims. (Cl. 260—78.4)

This invention relates to an improved process for the manufacture of solid polymers of relatively low molecular weight, and particularly to the manufacture of prepolymers formed from polyfunctional monomers. This application is a continuation-in-part of copending application Serial No. 575,361, filed April 2, 1956, now abandoned.

The term "prepolymer" is used to describe thermoplastic polymerization products of relatively low molecular weight, which contain residual unsatauration and are capable of further polymerization to rigid, cross-linked structures. They are generally prepared by addition polymerization of polyfunctional monomers containing more than one polymerizable unsaturated group. Such prepolymers are used in molding powders, laminates and coatings, as cross-linking agents, in combinations with other resins and in many other applications. The use of prepolymers offers many advantages over the use of the corresponding monomers, such as ease of handling, lack of shrinkage during final cure, and stability.

An ideal prepolymer for general utility should be in the form of a free flowing powder. Such a prepolymer would be readily handled and stored, and could easily be blended, poured, compounded, dissolved in suitable solvents, or otherwise treated for particular applications.

A major difficulty in the manufacture of prepolymers lies in the recovery from the polymerization mixture of these thermoplastic polymeric materials in a solid, non-tacky form. Even with polymers of relatively high molecular weight, if a polymer solution containing unreacted monomer is mixed with a non-solvent for the polymer, in order to precipitate the polymer and dissolve the monomer, the polymer generally precipitates as a sticky mass which contains occluded monomer, and which cannot be readily processed on conventional equipment to remove the monomer.

This effect is most pronounced in the case of prepolymers, whose relatively low molecular weight makes precipitation and separtaion of uncontaminated polymer even harder to achieve. It has been necessary to use very dilute solutions and low conversions of polymer, or a very large excess of solvent, to reduce the amount of occluded monomer. Neither of these approaches is feasible on a commercial scale. In fact, the difficulties of separating pure solid prepolymers from polymerization mixtures have been such that these products have heretofore been supplied to the trade as solutions, wherein the prepolymer is dissolved either in the monomer or in some other solvent for both prepolymer and monomer. Prior to the invention described herein, no practical and efficient means of preparing a dry prepolymer with good physical properties and appearance was available.

Accordingly, a purpose of this invention is to provide an improved method for prepolymer manufacture.

Another purpose is to provide a novel method for separating prepolymer from monomer in the polymerization mixture.

Another purpose is to provide a prepolymer in the form of a free-flowing powder.

Another purpose is to provide a solid prepolymer which is free of occluded monomer and solvent.

Another purpose is to provide a continuous process for commercial operation.

These and other purposes, and attendant advantages, will become apparent from the subsequent description of this invention.

It has now been discovered that a free-flowing, fusible prepolymer can be readily separated from a solution of the prepolymer in unreacted monomer, using a relatively small excess of precipitant for the prepolymer, yet precipitating the prepolymer free of occluded monomer so that it is readily dried to a free-flowing non-tacky powder. This is accomplished by passing the solution of prepolymer in unreacted monomer into a shearing zone, such as that of a colloid mill, simultaneously passing into said shearing zone a liquid precipitant which is a solvent for the monomer and a non-solvent for the prepolymer. The mixture is subjected to shearing forces, and the result is the immediate precipitation of the prepolymer from the mixture, in a state substantially free of any occluded monomer, precipitant, or any diluent which may have been present during the polymerization. This precipitate is then converted into a free-flowing powder merely by washing and drying—whereas previously used methods of separating prepolymer from unreacted monomer, such as stirring into a large excess of precipitant to dissolve the monomer and precipitate the prepolymer, have produced incomplete separations and tacky products which are difficult to handle and process. The liquid precipitant used herein need not be present in large excess, as has been the case heretofore, but even a two-fold excess of precipitant is adequate to extract occluded monomer and precipitate the prepolymer; such a slight excess of precipitant would effect no separation at all in the prior art processes—yet as used herein results not only in an improved product, but also in substantial economy of operation, simplified recovery procedures, and other advantages of commercial importance.

The process of this invention is applicable to the separation of prepolymers containing residual unsaturation from the solutions in which they are prepared. A monomer containing more than one polymerizable group, either undiluted or in the presence of a diluent, co-monomer or other additive, is polymerized until a fusible polymer is formed, stopping the reaction before gelation occurs. If a diluent is used, the concentration and nature of the diluent may be adjusted to control the temperature at which the mixture refluxes, and also to affect the solubility relations among the components of the reaction mixture. A peroxide catalyst is usually used, although air, heat, light, basic and acidic catalysts, and other means of initiating free radical polymerization may be used. The polymerization is interrupted before the fusible polymer is converted into a gel. The reaction time varies with the nature of the monomer, the catalyst, the concentration of the reactants and the reaction conditions. The interruption of the polymerization before gelation may be accomplished by a variety of methods, such as lowering the temperature to stop the reaction or adding an inhibitor either before or during the polymerization reaction. Since for each polymerization system the degree of conversion obtainable before gelation occurs is different, polymerization techniques may vary over a wide range.

The separation of the prepolymer from the polymerization mixture is accomplished as follows: The polymerization mixture, which consists essentially of prepolymer dissolved in unreacted monomer, and may contain an additional diluent, is mixed with the precipitant, in which the monomer and diluent are soluble and the prepolymer is insoluble. This mixing step is carried out in a shearing zone, by simultaneously passing the polymerization mixture and the precipitant into the shear zone and subjecting them to shearing forces. The prepolymer is precipitated essentially instantaneously, and the monomer, and diluent if any, are dissolved in the liquid precipitant.

A ready source of high shearing forces, particularly suitable for use in the instant invention, is a colloid mill. A colloid mill consists of a rapidly revolving rotor enclosed with small clearances in a stator, and is ordinarily used to prepare emulsions and colloidal suspensions, wherein a finely dispersed liquid or solid is suspended in a liquid. In this novel method of separating and precipitating prepolymers from solutions, unreacted monomer is simultaneously dissolved and separated from the precipitating prepolymer.

The precipitant is, as stated above, a solvent for unreacted monomer and any diluent present, and a non-solvent for the prepolymer. Catalyst residues may also be separated from prepolymer in this way. Of course the precipitant selected for any particular separation will depend on the particular monomer and polymer involved. In general, lower aliphatic alcohols are effective precipitants, and these are preferred since they are readily washed and dried from the precipitated prepolymer, and also readily separated from the solution of unreacted monomer, thus facilitating recovery and recycle of both precipitant and monomer.

At least two, and preferably about four to ten volumes of precipitant are used per volume of polymerization mixture in the shearing zone. Larger amounts of precipitant are in general unnecessary to achieve adequate separation and dissolution of occluded monomer and precipitation of polymer, and it is of course uneconomical to use unnecessarily large amounts of precipitant; on the other hand, the use of very large excesses of precipitant may be advantageous if it is desired to extract the last traces of occluded monomer from the polymer, or if the particular monomer involved is of limited solubility in the precipitant. Too little precipitant reduces the efficiency of the separation, by not providing adequate solvent power for unreacted monomer. Relative volumes are conveniently adjusted by adjusting the rate of feed of the streams of polymerizate and precipitant into the colloid mill. The temperature conditions will depend on the solubility relations of the particular system involved, but due to the thermoplastic nature and the solubility of the prepolymers themselves, it is usually preferred to carry out the precipitation and subsequent steps in the cold. After the prepolymer is precipitated on passing through the shearing zone, it is separated by filtration, and washed and dried, to produce a free-flowing powder.

Prepolymers adaptable to the process of this invention are derived from polyunsaturated compounds containing two or more polymerizable groups. Of particular interest are the polyallylic esters of polycarboxylic acids, such as allyl and methallyl esters of orthophthalic, isophthalic and terephthalic acid, of bicyclo(2,2,1)-5-heptene-2,3-dicarboxylic acid, of bicyclo(2,2,1)-5-heptene-1,4,5,6,7,7-hexachlor-2,3-dicarboxylic acid, and of tetrahydrophthalic and hexahydrophthalic acid, cyanuric acid, isocyanuric acid, maleic acid, and many other polyallylic esters. The prepolymers may be homopolymers, or copolymers with other mono or polyunsaturated compounds.

Illustrated below are several specific embodiments of this process, designed to exemplify and not to limit the invention. All parts are by weight unless otherwise indicated.

*Example I*

Diallyl phthalate prepolymer was prepared as follows: A stainless steel reactor was charged with 8860 pounds of diallyl phthalate monomer, 622 pounds of isopropanol (91% by volume) and 75 pounds of 50.4% hydrogen peroxide. These were thoroughly agitated and heated to a pot temperature of 104–108° C. under total reflux at atmospheric pressure, by withdrawing any excess isopropanol until the desired temperature was reached. The polymerization reaction was followed by continuously measuring the viscosity of the reaction mixture, which depends on the percent of monomer converted and the average molecular weight of the prepolymer formed. After 10 hours the viscosity had increased to about 27 cps. at 106° C., corresponding to about 27% conversion of monomer to prepolymer. A convenient conversion for diallyl phthalate prepolymer, before gelation, is in the range of 25–35%. The crude reaction product consisted of diallyl phthalate prepolymer dissolved in monomer and isopropanol. In precipitating the converted prepolymer, the product from the reaction vessel was cooled, and pumped simultaneously with about 5 times its volume of isopropanol (91% by volume) into a colloid mill set to operate at 3600 r.p.m. with 0.001 inch clearance between rotor and stator and a flow rate of 200 gallons per hour. A total of 48,000 pounds of isopropanol was used, cooled so that the precipitation took place at a temperature of 0° C. The mixture resulting from this separation step consisted of precipitated prepolymer particles suspended in an isopropanol/monomer solution. This suspension was agitated for about 45 minutes at about 15° C., to coagulate the smaller particles and aid filtration. The slurry was then cooled to about 0–5° C. and filtered on a rotary vacuum continuous filter. The filter cake was reslurried in cold isopropanol, and refiltered. A third washing and filtration were conducted from a cold water slurry, after which the wet filter cake was dried at about 80° C. The diallyl phthalate prepolymer produced was a free-flowing white powder which was thermoplastic, soluble in low molecular weight ketones and aromatic hydrocarbons and insoluble in water, alcohols and petroleum solvents.

*Example II*

A copolymer was prepared as follows: To a reactor was charged 185 parts of diallyl phthalate, 187 parts of triallyl cyanurate, 45 parts of isopropanol (91% by volume) and 3.7 parts of 50% aqueous hydrogen peroxide. These were thoroughly agitated and heated to a pot temperature of 110° C. for 4.3 hours. The crude reaction product was cooled, and pumped simultaneously with ten times its volume of methanol into a colloid mill set to operate at 3000 r.p.m. with 0.001 inch clearance between rotor and stator and a flow rate of 6 gallons per minute, at a temperature of 0–5° C. The mixture from the colloid mill was cooled to 5° C. and filtered. The filter cake was slurried in cold methanol and refiltered. A third washing and filtration were conducted from cold water, after which the white filter cake was dried at 80° C. The product was a free-flowing white powder, obtained in 31.5% yield. A 25% solution of this copolymer in diallyl phthalate had a viscosity of 1250 cps. at 25° C. The melting range of the copolymer was 100–120° C.

This copolymer was cured by mixing with 2% tert.-butyl perbenzoate, on heating for 15 minutes at 175° C. and 6,000 p.s.i., to produce a clear infusible disk.

*Example III*

Dimethallyl isophthalate was polymerized as follows: One hundred parts of dimethallyl isophthalate, 12 parts of methanol and 0.38 part of tert.-butyl perbenzoate were charged to a reactor, agitated and refluxed at 110 C. for 3.7 hours at a pressure of 50 p.s.i. The viscosity of the reaction mixture was 300 cps., measured at 25° C. The mixture was cooled to −10° C., and pumped simultaneously with about four times its volume of methanol into a colloid mill set to operate at 4000 r.p.m. with 0.001 inch clearance between rotor and stator and a flow rate of 12 gallons per minute. The resulting suspension was agitated for about 30 minutes at 15° C., cooled to 0° C., and filtered. The filter cake was reslurried in cold methanol and refiltered. A third washing and filtration were conducted from a cold water slurry, and the white filter cake was dried at 80° C. The product was a free-flowing white powder, having a viscosity of 628 cps. at 25° C., measured as a 25% solution in diallyl phthalate.

The powder was mixed with 2% of tert.-butyl perbenzoate, and cured by heating for 15 minutes at 175° C. and 6,000 p.s.i., to produce a clear, infusible, insoluble disk having a Rockwell hardness of 117 (M scale).

*Example IV*

One hundred parts of diallyl bicyclo(2,2,1)-5-heptene-2,3-dicarboxylate was mixed with 8 parts of isopropanol (99% by volume) and 0.37 part of tert.-butyl perbenzoate, charged to a reactor, agitated and refluxed at 108–109° C. for 5.75 hours, at which time the viscosity of the reaction mixture was 300 cps., measured at 25° C. The mixture was cooled at 0° C., and pumped simultaneously with about eight times its volume of methanol, also at 0° C., into a colloid mill set to operate at 3600 r.p.m. with 0.001 inch clearance between rotor and stator and a flow rate of 200 gallons per hour, at a temperature of about 0° C. The mixture from the colloid mill was agitated for about one hour at 15° C., then cooled to 0° C. and filtered. The filter cake was washed with cold methanol and with water, and dried at 80° C. The product was a free flowing powder, having a viscosity of 705.5 centipoises at 25° C., measured as a 25% solution in diallyl phthalate.

It is apparent that this invention is susceptible to numerous modifications within the scope of the disclosure, and it is intended to include such modifications within the scope of the following claims.

I claim:

1. The method of producing a dry, free flowing, fusible polymer containing residual unsaturation and capable of further polymerization to a thermoset resin, comprising: polymerizing a monomeric polyallylic ester of a polycarboxylic acid wherein the allylic group is selected from the class consisting of allyl and methallyl, under free radical polymerization conditions terminating said polymerization before gelation occurs, thereby producing a solution of polymer in monomer; passing said solution of polymer in monomer into a shearing zone, said shearing zone acting on a small cross-sectional area of said solution; subjecting said solution to high shearing stresses in the shearing zone; simultaneously passing into said shearing zone at least two volumes per volume of said solution of an unreactive liquid precipitant which is a solvent for said monomer and a nonsolvent for said polymer, thus precipitating the polymer while in the shearing zone and simultaneously dissolving the monomer in said liquid precipitant; passing the mixture of precipitated polymer and solution of monomer in liquid precipitant out of said shearing zone; separating the precipitated polymer from the solution of monomer in liquid precipitant and washing and drying said polymer; thereby producing a free flowing fusible polymer.

2. The method of producing a dry, free flowing, fusible polymer containing residual unsaturation and capable of further polymerization to a thermoset resin, comprising: polymerizing a diallylic phthalate monomer wherein the allylic group is selected from the class consisting of allyl and methallyl, under free radical polymerization conditions, until about 25–40% of said monomer is converted to polymer, said polymer being in solution in said monomer; passing said solution of polymer in monomer into a shearing zone, said shearing zone acting on a small cross-sectional area of said solution; subjecting said solution to high shearing stresses in the shearing zone; simultaneously passing into said shearing zone at least two volumes per volume of said solution of an unreactive liquid precipitant which is a solvent for said monomer and a nonsolvent for said polymer, thus precipitating the polymer while in the shearing zone and simultaneously dissolving the monomer in said liquid precipitant; passing the mixture of precipitated polymer and solution of monomer in liquid precipitant out of said shearing zone; separating the precipitated polymer from the solution of monomer in liquid precipitant and washing and drying said polymer; thereby producing a free flowing fusible polymer.

3. The method of producing a dry, free flowing, fusible polymer containing residual unsaturation and capable of further polymerization to a thermoset resin, comprising: polymerizing a diallylic phthalate monomer wherein the allylic group is selected from the class consisting of allyl and methallyl, under free radical polymerization conditions, until about 25–40% of said monomer is converted to polymer, said polymer being in solution in said monomer; passing said solution of polymer in monomer into a shearing zone, said shearing zone acting on a small cross-sectional area of said solution; subjecting said solution to high shearing stresses in the shearing zone; simultaneously passing into said shearing zone about four to ten volumes per volume of said solution of a lower aliphatic alcohol, thus precipitating the polymer while in the shearing zone and simultaneously dissolving the monomer in said alcohol; passing the mixture of precipitated polymer and solution of monomer in alcohol out of said shearing zone; separating the precipitated polymer from the solution of monomer in alcohol and washing and drying said polymer; thereby producing a free flowing fusible polymer.

4. The method of claim 3, wherein said monomer is diallyl orthophthalate.

5. The method of claim 3, wherein said monomer is dimethallyl isophthalate.

6. The method of producing a dry, free flowing, fusible polymer containing residual unsaturation and capable of further polymerization to a thermoset resin, comprising: partially polymerizing a diallylic ester of a bicycloaliphatic dicarboxylic acid monomer wherein the allylic group is selected from the class consisting of allyl and methallyl, under free radical polymerization conditions terminating said polymerization before gelation occurs, thereby producing a solution of polymer in monomer; passing said solution of polymer in monomer into a shearing zone, said shearing zone acting on a small cross-sectional area of said solution; subjecting said solution to high shearing stresses in the shearing zone; simultaneously passing into said shearing zone at least two volumes per volume of said solution of an unreactive liquid precipitant which is a solvent for said monomer and a nonsolvent for said polymer, thus precipitating the polymer while in the shearing zone and simultaneously dissolving the monomer in said liquid precipitant; passing the mixture of precipitated polymer and solution of monomer in liquid precipitant out of said shearing zone; separating the precipitated polymer from the solution of monomer in liquid precipitant and washing and drying said polymer; thereby producing a free flowing fusible polymer.

7. The method of producing a dry, free flowing, fusible copolymer containing residual unsaturation and capable of further polymerization to a thermoset resin, comprising: copolymerizing a mixture of monomeric polyallylic esters of polycarboxylic acids wherein the allylic group is selected from the class consisting of allyl and methallyl, under free radical polymerization conditions terminating said polymerization before gelation occurs, thereby producing a solution of copolymer in monomers; passing said solution of copolymer in monomers into a shearing zone, said shearing zone acting on a small cross-sectional area of said solution; subjecting said solution to high shearing stresses in the shearing zone; simultaneously passing into said shearing zone at least two volumes per volume of said solution of an unreactive liquid precipitant which is a solvent for said monomers and a nonsolvent for said copolymer, thus precipitating the copolymer while in the shearing zone and simultaneously dissolving the monomers in said liquid precipitant; passing the mixture of precipitated copolymer and solution of monomers in liquid precipitant out of said shearing zone; separating the precipitated copolymer from the solution of monomers in liquid precipitant and washing and drying said copolymer; thereby producing a free flowing fusible copolymer.

8. The method of claim 7, wherein said mixture of monomers consists of at least about 50% of a diallylic phthalate wherein the allylic group is selected from the class consisting of allyl and methallyl.

References Cited in the file of this patent
UNITED STATES PATENTS
2,832,758    Heiberger _____ Apr. 29, 1958